United States Patent
Fang et al.

(10) Patent No.: US 12,368,738 B1
(45) Date of Patent: Jul. 22, 2025

(54) METHOD FOR CONSTRUCTING A VEHICLE NETWORKING INTRUSION DETECTION MODEL BASED ON FEDERATED LEARNING

(71) Applicant: Zhejiang Agricultural and Forestry University, Hangzhou (CN)

(72) Inventors: Kai Fang, Hangzhou (CN); Hailin Feng, Hangzhou (CN); Wei Wang, Hangzhou (CN); Ali Kashif Bashir, Hangzhou (CN); Tingting Wang, Hangzhou (CN)

(73) Assignee: Zhejiang Agricultural and Forestry University, Hangzhou (CN)

( * ) Notice: Subject to any disclaimer, the term of this patent is extended or adjusted under 35 U.S.C. 154(b) by 0 days.

(21) Appl. No.: 19/185,322

(22) Filed: Apr. 22, 2025

(30) Foreign Application Priority Data

Jul. 2, 2024 (CN) .......................... 202410880915.X

(51) Int. Cl.
*H04L 9/40* (2022.01)
*H04L 41/16* (2022.01)

(52) U.S. Cl.
CPC .......... *H04L 63/1416* (2013.01); *H04L 41/16* (2013.01)

(58) Field of Classification Search
CPC .......................... H04L 63/1416; H04L 41/16
USPC ........................................................ 726/23
See application file for complete search history.

(56) References Cited

U.S. PATENT DOCUMENTS

| | | | | |
|---|---|---|---|---|
| 8,418,249 B1 * | 4/2013 | Nucci | ................... | G06F 21/552 |
| | | | | 709/225 |
| 2024/0031517 A1 * | 1/2024 | Liu | ........................ | G06V 10/22 |
| 2024/0144141 A1 * | 5/2024 | Cella | .................. | G06Q 30/0206 |
| 2025/0005916 A1 * | 1/2025 | Willmott | .............. | G06V 10/761 |
| 2025/0174308 A1 * | 5/2025 | Liu | ........................ | G16C 20/70 |

* cited by examiner

Primary Examiner — Badri Narayanan Champakesan
(74) Attorney, Agent, or Firm — JEEN IP LAW, LLC

(57) ABSTRACT

A method for constructing a vehicle networking intrusion detection model based on federated learning is provided, which includes decoupling a local model according to a feature extractor and a classifier; selecting other vehicle clients with higher similarity to each vehicle client; collecting a local feature extractor from each vehicle client and distributing them to each vehicle client along with a global classifier obtained in a previous round, by a server; aggregating the local classifier and feature extractor from other vehicle clients to form an evaluation model; updating weights to obtain an updated local feature extractor, and combining it with the global classifier in the previous round to update the local model; aggregating feature representations extracted from a local dataset, and obtaining a current feature representation; collecting all current feature representations to train a global classifier and distributing them to vehicle clients that participate a next round of training.

6 Claims, 13 Drawing Sheets

METHOD FOR CONSTRUCTING A VEHICLE NETWORKING INTRUSION DETECTION MODEL BASED ON FEDERATED LEARNING

CROSS-REFERENCE TO RELATED APPLICATIONS

This application claims priority to Chinese Patent Application No. 202410880915.X, filed on Jul. 2, 2024, which is hereby incorporated by reference in its entirety.

TECHNICAL FIELD

The present disclosure relates to the field of internet of vehicles technologies, and in particular, to a method for constructing a vehicle networking intrusion detection model based on federated learning.

BACKGROUND

With the rapid development of the Internet of Vehicles, network security issues are becoming increasingly prominent, and an interconnectivity between vehicles and transportation infrastructure is increasing, which provides possibilities for achieving autonomous driving, remote monitoring, and intelligent traffic management functions. However, this convenience is also accompanied by challenges in terms of security and privacy protection. With the continuous changes and development of the automotive industry, the attack methods of illegal attackers are also evolving, from simple hacking actions to more sophisticated and covert attack methods. The report data shows that almost all automotive attack threats (97%) are carried out remotely, with 70% of remote attacks being carried out at a distance, allowing attackers to launch attacks without approaching the target vehicle.

Furthermore, the attackers are constantly improving their attack methods. For example, when criminals obtain critical digital infrastructure information of a certain car, they may use it to extort high ransom from the vehicle manufacturer and may also illegally sell private data. During this process, there is a high possibility of large-scale data breaches, denial of service (DOS) attacks, and production disruptions that could affect the entire supply chain. This issue has become very prominent in 2022, and with the further improvement of digitalization in the automotive industry, it is expected that attacks against the automotive industry will become more common.

Therefore, intrusion detection technology has become crucial. Intrusion detection systems monitor the communication and behavior of vehicle networking systems, identify and defend against various network attacks such as malware injections, data tampering, and denial of service attacks, to ensure the security and reliability of vehicle networking systems. If IDS detects suspicious activity, it can take action to prevent malicious attacks and prevent road accidents from occurring. The security of the Internet of Vehicles and intrusion detection have formed a complementary relationship. An effective intrusion detection system not only ensures the secure operation of the vehicle networking system, but also provides a wider range of application scenarios and challenges for intrusion detection technology. On the Internet of Vehicles, a large amount of distributed data is involved, including sensor data from different vehicles, control information, and real-time status data of transportation infrastructure. These data are typically stored in different vehicles and devices and are subject to strict privacy protection restrictions. Traditional intrusion detection methods are typically based on centralized architectures that require collection and analysis of large amounts of raw data. This not only incurs significant communication and storage costs but also carries a risk of data privacy breaches. Besides that, traditional intrusion detection methods often struggle to cope with constantly changing attack patterns, resulting in low detection accuracy and high false alarm rates.

SUMMARY

In order to solve the technical problems mentioned above, cope with constantly changing attack patterns, and improve the accuracy of intrusion detection, the present disclosure provides a method for constructing a vehicle networking intrusion detection model based on federated learning.

The technical solution is as follows.

A method for constructing a vehicle networking intrusion detection model based on federated learning, including the following steps:

decoupling a local model in vehicles according to a feature extractor and a classifier;

selecting randomly clients to participate in training, and selecting other vehicle clients with higher similarity to each vehicle client that participates in training with a similarity matrix;

collecting a local feature extractor from each vehicle client and distributing collected feature extractor parameters and a global classifier obtained from a previous round of the vehicle client to each vehicle client, by a server;

aggregating the local classifiers of each vehicle client that participates in training with the feature extractors of other vehicle clients distributed by the server to form an evaluation model that includes multiple feature extractors;

evaluating an obtained evaluation model on the local model of each vehicle client and updating weights of the similarity matrix to obtain an updated local feature extractor p of the vehicle client;

combining the updated local feature extractor $\varphi_k^t$ of the vehicle client with the previous round's global classifier $\theta^{t-1}$, and updating the local model $\omega_k^t$ by performing gradient descent of a loss function on the local model of the vehicle client;

aggregating feature representations extracted from a local dataset with the local feature extractors of the vehicle client after and before updating to obtain a current feature representation $R^{t,s}_{agg}$;

collecting all current feature representations $\mathcal{R}^{t,s}_{agg}$ to train the global classifier $\theta^t$, and distributing them to vehicle clients that participate in a next round of training, by the server.

In some embodiments of the present disclosure, the method further includes constructing a similarity matrix MN of an N-dimensional vehicle client and evaluating n+1 models on the local model of the vehicle client to update the weight of the similarity matrix MN, and a weight update expression is:

$$\delta_{k,i}^t = \frac{\mathcal{L}_k^t(\omega_k^{t-1}) - \mathcal{L}_{k,i}^t(\omega_{k,i}^t)}{\|\varphi_k^{t-1} - \varphi_{k,i}^t\|}, (i \in n)$$

where $\mathcal{L}_k^t(\omega_k^{t-1})$ is a loss function value of the local model $\omega_k^{t-1}$ of the vehicle client before weight updating;

$\mathcal{L}_{k,i}^t(\omega_{k,i}^t)$ is a loss function value of the local model $\omega_{k,i}^t$ of the vehicle client after weight updating;

$\varphi_k^{t-1}$ is a local model feature extractor of the vehicle client before weight updating;

$\varphi_{k,i}^t$ is a local model feature extractor of the vehicle client after weight updating.

In some embodiments of the present disclosure, updating the similarity matrix MN includes:

normalizing a sum of all weights to 1 using a normalization operation;

$$\hat{\delta}_{k,i}^t = \frac{\delta_{k,i}^t}{\sum_{i \in n} \delta_{k,i}^t}$$

weighting and summing a difference between a similar vehicle client's feature extractor $\varphi_{k,i}^t$ and the previous round's feature extractor $\varphi_k^{t-1}$ using the normalized weight $\hat{\delta}_{k,i}$ to update the feature extractor $\varphi_k^t$ of the local model $\omega_i^t$ and it is expressed as:

$$\varphi_k^t = \varphi_k^{t-1} \Sigma_{i \in n} \hat{\delta}_{k,i} (\varphi_{k,i}^t - \varphi_k^{t-1})$$

after updating weights $[\hat{\delta}_{k,1}^t, \ldots, \hat{\delta}_{k,n}^t]$ of n vehicle clients with high similarity to a vehicle client k, updating a weight vector $\delta_k^t$ of the vehicle client k;

collecting updated weights $<\delta_1^t, \ldots, \delta_k^t>$ for each vehicle client that participates in training and updating the similarity matrix $M_N$ by the server.

In some embodiments of the present disclosure, training a global classifier with all current feature representations collected by the server includes:

extracting features from the local dataset of the vehicle client with the previous round's historical feature extractor and new feature extractor after weight updating, obtaining corresponding historical feature representations and current feature representations;

classifying the current feature representations and historical feature representations of the obtained vehicle client according to data category;

calculating a distribution difference between the current feature representations and the historical feature representations with a maximum mean difference statistical method, obtaining a maximum mean distribution difference between the historical feature representations and the current feature representations;

using a normalized maximum mean difference as a weight, aggregating the historical feature representations and the current feature representations to obtain a feature representation $R_{agg}^{t,s}$ that combines historical and current information;

collecting the feature representations $R_{agg}^{t,s}$ aggregated by all vehicle clients that participate in training in the current round t to train a global classifier, by the server; calculating a gradient of the loss function & with respect to the global classifier $\theta^{t-1}$, and obtaining a new global classifier $\theta^t$.

In some embodiments of the present disclosure, the extracting features from the local dataset of the vehicle client with the previous round's historical feature extractor $\varphi_k^{t-1}$ and new feature extractor $\varphi_k^t$ after weight updating and obtaining corresponding feature representations include:

$$\hat{\mathcal{R}}_k^{t-1,s} = \frac{1}{|D_k^s|} \sum_{i \in D_k^s} \mathcal{F}_k^{t-1}(\varphi_k^{t-1}; x_i);$$

$$\hat{\mathcal{R}}_k^{t,s} = \frac{1}{|D_k^s|} \sum_{i \in D_k^s} \mathcal{F}_k^t(\varphi_k^t; x_i);$$

where $\mathcal{F}_k^t(\varphi_k^t; x_i)$ is extracting features from a sample subset $x_i$ of the local dataset $D_k^s$ for a $k^{th}$ vehicle client using the new feature extractor $\varphi_k^t$;

$\mathcal{F}_k^{t-1}(\varphi_k^{t-1}; x_i)$ is extracting features from a sample subset $x_i$ of the local dataset $D_k^s$ for the $k^{th}$ vehicle client using the historical feature extractor $\varphi_k^{t-1}$;

$\tilde{\mathcal{R}} R_k^{t-1,s}$ and $\tilde{\mathcal{R}}_k^{t,s}$ are average feature representations of the $k^{th}$ vehicle client for each category in rounds t−1 and t, respectively.

In some embodiments of the present disclosure, the calculating a distribution difference between the current feature representations and the historical feature representations with a maximum mean difference statistical method, obtaining a maximum mean distribution difference between the historical feature representations and the current feature representations, and a distance is represented as follows:

$$MMD(P, Q) = \frac{1}{n_{old}^2} \sum_{p=1}^{n_{old}} \sum_{q=1}^{n_{old}} k\left(\hat{\mathcal{R}}_k^{t-1,s}{}_p, \hat{\mathcal{R}}_k^{t-1,s}{}_q\right) + \frac{1}{n_{new}^2} \sum_{p=1}^{n_{new}} \sum_{q=1}^{n_{new}} k\left(\hat{\mathcal{R}}_k^{t,s}{}_p, \hat{\mathcal{R}}_k^{t,s}{}_q\right) - \frac{2}{n_{old} n_{new}} \sum_{p=1}^{n_{old}} \sum_{q=1}^{n_{new}} k\left(\hat{\mathcal{R}}_k^{t,s}{}_p, \hat{\mathcal{R}}_k^{t-1,s}{}_q\right)$$

$$\frac{1}{n_{old}^2} \sum_{p=1}^{n_{old}} \sum_{q=1}^{n_{new}} k\left(\hat{\mathcal{R}}_k^{t-1,s}{}_p, \hat{\mathcal{R}}_k^{t-1,s}{}_q\right)$$

represents an internal self-similarity of the historical feature representation of round t−1;

$$\frac{1}{n_{new}^2} \sum_{p=1}^{n_{new}} \sum_{q=1}^{n_{new}} k\left(\hat{\mathcal{R}}_k^{t,s}{}_p, \hat{\mathcal{R}}_k^{t,s}{}_q\right)$$

represents an internal self-similarity of the current feature representation of round t;

$$\frac{-2}{n_{old} n_{new}} \sum_{p=1}^{n_{old}} \sum_{q=1}^{n_{new}} k\left(\hat{\mathcal{R}}_k^{t,s}{}_p, \hat{\mathcal{R}}_k^{t-1,s}{}_q\right)$$

represents a cross similarity of data distribution between the historical feature representations and the current feature representations;

P and Q represent probability distributions of the historical feature representations $\tilde{\mathcal{R}}_k^{t-1,s}$ and the current feature representations $\tilde{\mathcal{R}}_k^{t,s}$, respectively;

$n_{old}$ and $n_{new}$ represent the number of samples for the historical feature representations $\tilde{\mathcal{R}}_k^{t-1,s}$ and the current feature representations $\tilde{\mathcal{R}}_k^{t,s}$, respectively;

$k(\cdot,\cdot)$ is a Gaussian kernel function configured to measure the similarity between two samples.

In some embodiments of the present disclosure, a normalized maximum mean difference is used as the weight W, and its expression is:

$$W = 1 - \frac{MMD_{value} - MMD_{min}}{MMD_{max} - MMD_{min}}$$

where $MMD_{value}$ is a maximum mean distribution difference between the calculated historical feature representations and the current feature representations; $MMD_{max}$ is a maximum value among the calculated MMD values; $MMD_{min}$ is a minimum value among the calculated MMD values.

The technical solution of the present disclosure has the following advantages.

The present disclosure utilizes federated learning to integrate security logs and event data from different vehicles and transportation infrastructure, constructing a more comprehensive and accurate intrusion detection model. Through the federated learning, various vehicle clients on the Internet of Vehicles can jointly learn and improve intrusion detection models without sharing sensitive raw data, thereby ensuring data privacy and security. Which provides strong technical support for the security and privacy protection of the Internet of Vehicles, and also provides more effective and sustainable solutions for intrusion detection.

In the present disclosure, a training process of federated learning on is on the local devices and communicates only through sharing model parameters, without directly sharing raw data, thereby effectively protecting data privacy. As only model parameters need to be uploaded instead of the entire dataset, the communication costs are significantly reduced.

The global classifier generated by the method of the present disclosure can retain historical information, avoiding the loss of useful features and patterns. This helps to maintain memory of previously learned information during the model update process, thereby better utilizing past experience and knowledge. At the same time, due to the distribution of training data across multiple vehicle clients, the model's dependence on a single data point is reduced, thereby enhancing its robustness.

BRIEF DESCRIPTION OF DRAWINGS

In order to illustrate specific embodiments of the present disclosure more clearly, a brief introduction will be given to the accompanying drawings required for the specific embodiments. It is obvious that the accompanying drawings described below are some embodiments of the present disclosure. For those skilled in the art, other drawings can be obtained based on these drawings without creative work.

DESCRIPTION OF EMBODIMENTS

The following will provide a clear and complete description of the technical solution of the present disclosure in combination with the accompanying drawings. Obviously, the described embodiments are only a part of the embodiments of the present disclosure, not all of them. Based on the embodiments of the present disclosure, all other embodiments obtained by those skilled in the art without creative work are within the protection scope of the present disclosure.

The present disclosure provides a method for constructing a vehicle networking intrusion detection model based on federated learning. The local model of the vehicle client is divided into feature extractors and classifiers. For an update of the feature extractors, a similarity matrix is constructed between the vehicle clients to quantify and utilize the similarity between the local clients. This similarity is used to achieve knowledge transmission between clients and aggregate the local feature extractors. The global classifier was trained using feature representations extracted by the feature extractors. In each iteration, the feature extractor was used to extract features from a local dataset of the vehicle client and collect average feature representations of the local categories in the previous and current rounds. Subsequently, a distribution difference between the historical feature representation and the current feature representation is calculated using the Maximum Mean Difference (MMD). Using distribution differences as weights, new feature representation was aggregated, and it was uploaded to the server. The server-side trains global classifier using feature representations that balance historical and current feature representations, and transmits it to the client. The global classifier generated by the method of the present disclosure can retain historical information and avoid losing useful features and patterns. This helps to maintain memory of previously learned information during a model update process, thereby better utilizing past experience and knowledge and improving the robustness of the model. Furthermore, the vehicle client only uploads aggregated feature representations instead of the entire model, thereby reducing communication costs.

In order to achieve efficient recognition of heterogeneous data, the present disclosure adopts a personalized federated learning strategy, allowing each vehicle client to adjust the global model according to their own needs and characteristics, rendering it better adapt to local data distribution. The goal is to minimize the sum of losses of all clients' local models on the local dataset, that is:

$$\min \sum\nolimits_{k=0}^{N-1} \mathcal{L}_k(\omega_k).$$

Figure 1:
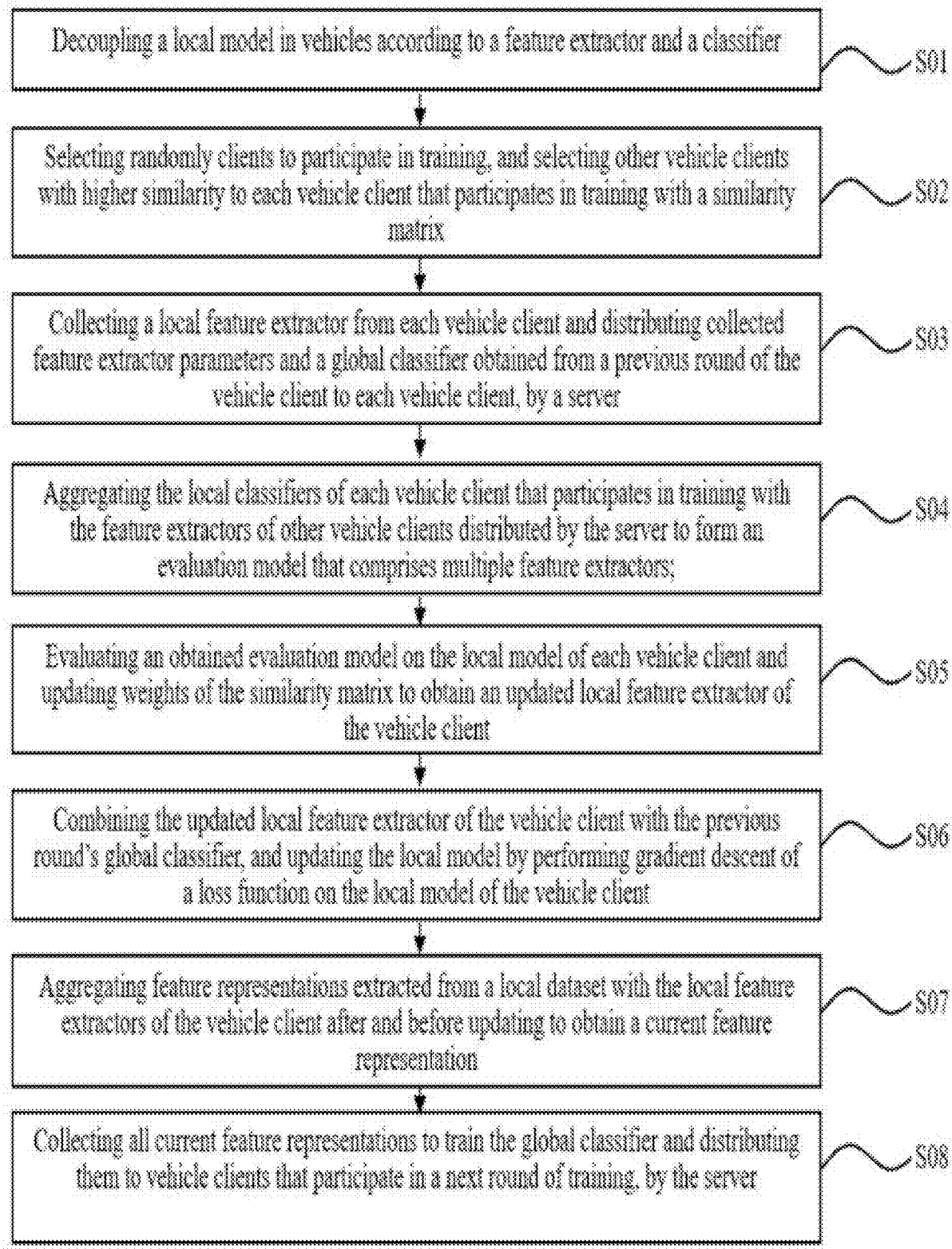
FIG. 1 is a flowchart of the method for constructing a vehicle networking intrusion detection model based on federated learning provided by the present disclosure.

As shown in FIG. 1, the specific steps are as follows:

S01: decoupling a local model in vehicles according to a feature extractor and a classifier.

The model $\omega$ is decoupled into two parts: $\varphi$ and $\theta$, for feature extraction and classification, and it is represented as:

$\omega = \varphi \circ \theta$ where, $\varphi$ is used as the feature extractor, $\theta$ is used as the classifier, and "$\circ$" represents model concatenation. An enhanced feature extraction strategy is used to aggregate $\varphi$ and the global classifier $\theta$ is trained to improve the system's generalization performance.

S02: Selecting randomly clients to participate in training, and selecting other vehicle clients with higher similarity to each vehicle client that participates in training with a similarity matrix.

Before the iteration begins, randomly initializing the heterogeneous local models $[\omega_0^0, \ldots, \omega_{N-1}^0]$ and the global classifier $\theta^0$, and initializing $M_N$ as a diagonal matrix. In a $t^{th}$ iteration, randomly selecting $K=\max(C \cdot N, 1)$ vehicles to participate in training, represented as $\mathcal{S}^t$. For each selected vehicle client $k \in \mathcal{S}^t$ to participate in training, selecting the top n vehicle clients based on weight size of the similarity matrix MN and collecting their feature extractors $<\varphi_{k,1}^t, \ldots, \varphi_{k,n}^t>$ S03: Collecting a local feature extractor from each vehicle client and distributing collected feature extractor parameters and a global classifier obtained from a previous round of the vehicle client to each vehicle client, by a server; the server receives the feature representation parameters of the feature extractor φ of sampled vehicles and distributes them to the selected sampled vehicles k.

S04: Combining and aggregating the local classifiers of each vehicle client that participates in training with the feature extractors of other vehicle clients distributed by the server to form an evaluation model that includes multiple feature extractors one by one; the expression is as follows:

$$\omega_{k,1}^t = \varphi_{k,1}^t \circ \theta^{t-1}, \ldots, \omega_{k,n}^t = \varphi_{k,n}^t \circ \theta^{t-1}$$

currently, each sampled vehicle contains a total of n+1 models, including the local model $\omega_k^{t-1} = \varphi_k^{t-1} \circ \theta^{t-1}$.

S05: Evaluating an obtained evaluation model on the local model of each vehicle client and updating the weight of the similarity matrix to obtain an updated local feature extractor $\varphi_k^t$ of the vehicle client.

Evaluating these n+1 models on the local model of the vehicle to update the weights of the similarity matrix N. Firstly, a loss function value of the local model $\omega_k^{t-1}$ is calculated as $\mathcal{L}_k^t(\omega_k^{t-1})$ and then a loss function value $\mathcal{L}_{k,i}^t(\omega\varphi_{k,i}^t)$ of $\omega_{k,i}^t$ hat is iteratively calculated. The weight update formula is as follows:

$$\delta_{k,i}^t = \frac{\mathcal{L}_k^t(\omega_k^{t-1}) - \mathcal{L}_{k,i}^t(\omega_{k,i}^t)}{\|\varphi_k^{t-1} - \varphi_{k,i}^t\|}, (i \in n)$$

the new weight is represented as L2 norm of a difference between the loss function value $\mathcal{L}_k^t(\omega_k^{t-1})$ of the local model $\omega_k^{t-1}$ and the loss function value $\mathcal{L}_k^t(\omega_k^{t-1})$. $\mathcal{L}_{k,n}^t(\omega_{k,i}^t)$ of the received model $\omega_k^{t-1}$ as well as a difference in feature extractor parameters between the two. When the difference obtained from $\mathcal{L}_k^t(\omega_k^{t-1}) - \mathcal{L}_{k,n}^t(\omega_{k,i}^t)$ is large, it indicates that the performance of the local model $\omega_k^{t-1}$ on a local validation set is worse than that of the received model $\omega_{k,i}^t$. At this time, a higher weight should be given to $\varphi_k^{t-1}$, and the sign of the difference represents the positive and negative contributions that the received model $\omega_{k,i}^t$ can bring. When the difference between and $\varphi_k^{t-1}$ and $\varphi_{k,i}^t$ is small, it indicates that the parameter difference between the two feature extractors is small. At this time, a larger gain can be obtained through shared knowledge, and a higher weight should be given to $\varphi_{k,i}^t$. When the difference between $\varphi_k^{t-1}$ and $\varphi_{k,i}^t$ is large, it indicates that the parameter differences between the two feature extractors are large, and the weights assigned will be relatively small because their improvement on the local model is limited.

To prevent instability caused by excessive or insufficient weights, normalization operation is used to ensure that a sum of all weights is 1:

$$\hat{\delta}_{k,i}^t = \frac{\delta_{k,i}^t}{\sum_{i \in n} \delta_{k,i}^t}$$

Subsequently, the normalized weights are used to update the feature extractor $\varphi_k^t$ of the local model $\omega_i^t$. An update process of $\varphi_k^t$ is represented as follows:

$$\varphi_k^t = \varphi_k^{t-1} + \sum_{i \in n} \hat{\delta}_{k,i}^t (\varphi_{k,i}^t - \varphi_k^{t-1})$$

After updating the weights $$\left[\hat{\delta}_{k,1}^t, \ldots, \hat{\delta}_{k,n}^t\right]$$

of n clients with high similarity to a vehicle k, a weight vector $$\delta_k^t$$

of the vehicle k is updated:

$$\delta_k^t \leftarrow \left[\hat{\delta}_{k,1}^t, \ldots, \hat{\delta}_{k,n}^t\right]$$

The server collects the updated weights $$<\delta_1^t, \ldots, \delta_k^t>$$

for each vehicle that participates in training and updates the similarity matrix $M_N$.

The local feature extractor of the vehicle was updated using the updated weights $\varphi_k^t$.

$$\varphi_k^t = \varphi_k^{t-1} + \Sigma_{i \in n} \hat{\delta}_{k,i}(\varphi_{k,i}^t - _k^{t-1}).$$

The update method of the local feature extractor $\varphi_k^t$ is to weight and sum the differences between the feature extractors $\hat{\delta}_{k,i}$ of similar vehicles and the feature extractors $\varphi_k^{t-1}$ of the previous round according to the normalized weight $\varphi_{k,i}^t$.

S06: Combining the updated local feature extractor of the vehicle client with the previous round's global classifier $\theta^{t-1}$, and updating the local model $\omega_k^t$ by performing a gradient descent of a loss function on the local model of the vehicle client.

The updated local feature extractor with the previous round's global classifier $\theta^{t-1}$ were combined to obtain a temporary local model $\tilde{\omega}_k^t$. The process of updating the local model $\omega_k^t$ by performing gradient descent of the loss function locally is represented as follows:

$$\omega_k^t \leftarrow \omega_k^t - \eta_\omega \nabla l(\tilde{\omega}_k^t; D_k)$$

where, $D_k$ is a local dataset held by vehicle k, and an update amplitude is controlled by the local learning rate $\eta_\omega$.

The present disclosure considers model updates provided by other vehicle clients and updates the local feature extractor based on their relative contributions, which enables the local feature extractor to learn useful information faster, thereby accelerating the convergence speed of the model and improving training efficiency.

Where $D_k$ is the local dataset held by vehicle k, and the update amplitude is controlled by the local learning rate $\eta_\omega$.

The present disclosure considers model updates provided by other vehicle clients and updates the local feature extractor based on their relative contributions, which enables the local feature extractor to learn useful information faster, thereby accelerating the convergence speed of the model and improving training efficiency.

S07: Aggregating feature representations extracted from a local dataset with the local feature extractors of the vehicle client after and before updating to obtain a current feature representation $R^{t,s}_{agg}$.

In order to further improve the generalization and adaptability of the system, the global classifier is trained by collecting and utilizing the feature representations extracted by the feature extractor. For the $k^{th}$ vehicle, it contains the previous round's feature extractor $\varphi_k^{t-1}$ and new feature extractor $\varphi_k^t$ updated using weights. Two feature extractors are used to extract new and old feature representations separately. The feature representation R is a set of numerical vectors that capture the essential information of the data segment.

The specific method is as follows.

S071: Extracting features from the local dataset of the vehicle client with the previous round's historical feature extractor and new feature extractor after weight updating, obtaining corresponding historical feature representations and current feature representations.

Classifying the feature representations according to the categories of the data. For the category s in the local dataset $D_k$ of the vehicle k, this process is represented as follows:

$$\hat{\mathcal{R}}^{t-1,s}_k = \frac{1}{|D^s_k|}\sum_{i \in D^s_k}\mathcal{F}^{t-1}_k(\varphi_k^{t-1}; x_i);$$

$$\hat{\mathcal{R}}^{t,s}_k = \frac{1}{|D^s_k|}\sum_{i \in D^s_k}\mathcal{F}^t_k(\varphi_k^t; x_i);$$

where $\mathcal{F}^t_k(\varphi_k^t; x_i)$ is extracting features from a sample subset $x_i$ of the local dataset $D^s_k$ for a $k^{th}$ vehicle client using the new feature extractor $\varphi_k^t$;

$\mathcal{F}^{t-1}_k(\varphi_k^{t-1}; x_i)$ is extracting features from a sample subset $x_i$ of the local dataset $D^s_k$ for the $k^{th}$ vehicle client using the historical feature extractor $\varphi_k^{t-1}$;

$\tilde{\mathcal{R}}^{t-1,s}_k$ and $\tilde{\mathcal{R}}^{t,s}_k$ are average feature representations of the kth vehicle client for each category in rounds t−1 and t, respectively.

S0702: Classifying the current feature representations and historical feature representations of the obtained vehicle client according to data category.

S073: Calculating a distribution difference between the current feature representations and the historical feature representations with a maximum mean difference statistical method, obtaining a maximum mean distribution difference between the historical feature representations and the current feature representations.

In order to coordinate the relationship between new and old features, the present disclosure uses Maximum Mean Difference (MMD) as a tool to measure distribution differences. The calculated distribution differences are further used to guide the feature aggregation process so as to better integrate feature representations from new and old perspectives. A distribution distance between the extracted current feature representations and the historical feature representations is represented as follows:

$$MMD(P, Q) = \frac{1}{n^2_{old}}\sum_{p=1}^{n_{old}}\sum_{q=1}^{n_{new}}k\left(\hat{\mathcal{R}}^{t-1,s}_{k\ p}, \hat{\mathcal{R}}^{t-1,s}_{k\ q}\right) +$$

$$\frac{1}{n^2_{new}}\sum_{p=1}^{n_{new}}\sum_{q=1}^{n_{new}}k\left(\hat{\mathcal{R}}^{t,s}_{k\ p}, \hat{\mathcal{R}}^{t,s}_{k\ q}\right) - \frac{2}{n_{old}n_{new}}\sum_{p=1}^{n_{old}}\sum_{q=1}^{n_{new}}k\left(\hat{\mathcal{R}}^{t,s}_{k\ p}, \hat{\mathcal{R}}^{t-1,s}_{k\ q}\right)$$

the above formula can be decomposed into the following three parts:

part $$\frac{1}{n^2_{old}}\sum_{p=1}^{n_{old}}\sum_{q=1}^{n_{old}}k\left(\hat{\mathcal{R}}^{t-1,s}_{k\ p}, \hat{\mathcal{R}}^{t-1,s}_{k\ q}\right) \quad \text{part 1}$$

represents an internal self-similarity of the historical feature representation of round t−1;

$$\frac{1}{n^2_{new}}\sum_{p=1}^{n_{new}}\sum_{q=1}^{n_{new}}k(\hat{\mathcal{R}}^{t,s}_{k\ p}, \hat{\mathcal{R}}^{t,s}_{k\ q}) \quad \text{part 2}$$

represents an internal self-similarity of the current feature representation of round t;

$$-\frac{2}{n_{old}n_{new}}\sum_{p=1}^{n_{old}}\sum_{q=1}^{n_{new}}k\left(\hat{\mathcal{R}}^{t,s}_{k\ p}, \hat{\mathcal{R}}^{t-1,s}_{k\ q}\right) \quad \text{part 3}$$

represents a cross similarity of data distribution between the historical feature representations and the current feature representations;

P and Q represent probability distributions of the historical feature representations $\tilde{\mathcal{R}}_k^{t-1,s}$; and the current feature representations $\tilde{\mathcal{R}}_k^{t,s}$, respectively;

$n_{old}$ and $n_{new}$ represent the number of samples for the historical feature representations $\tilde{\mathcal{R}}_k^{t-1,s}$; and the current feature representations $\tilde{\mathcal{R}}_k^{t,s}$, respectively;

k(•,•) is a Gaussian kernel function configured to measure the similarity between two samples; a formula for the Gaussian kernel function k(x, y) for two given vectors x and y is defined as follows:

$$(x, y) = e^{-\frac{\|x-y\|^2}{2\sigma^2}}$$

where σ is a bandwidth parameter of the Gaussian kernel function, which is configured to control a local influence range of the Gaussian kernel function. The larger the bandwidth σ, the larger the local influence range of the Gaussian kernel function. The Gaussian kernel function measures the similarity between two vectors x and y by calculating a Euclidean distance ∥x−y∥ between them.

S074: Using a normalized maximum mean difference as a weight, aggregating the historical feature representations and the current feature representations to obtain a feature representation $R^{t,s}_{agg}$ that combines historical and current information.

After obtaining the maximum mean difference between the distribution of the historical feature representation $\tilde{\mathcal{R}}_k^{t-1,s}$ and the current feature representation $\tilde{\mathcal{R}}_k^{t,s}$, weight W is assigned based on its distribution difference from the global feature representation. Weight W reflects the relative importance of each local feature representation in capturing the distribution of underlying data. The formula is as follows:

$$W = 1 - \frac{MMD_{value} - MMD_{min}}{MMD_{max} - MMD_{min}}$$

By performing normalization on the $MMD_{value}$, the range of its values is limited to [0,1], and the weight W is used to balance the contributions of the historical feature representations $\tilde{\mathcal{R}}_k^{t-1,s}$ and the current feature representations $\tilde{\mathcal{R}}_k^{t,s}$. Then, a weighted average is used to aggregate $\tilde{\mathcal{R}}_k^{t-1,s}$ and $\tilde{\mathcal{R}}_k^{t,s}$ to ensure that the current feature representation $\tilde{\mathcal{R}}_k^{t,s}$ with higher consistency with the historical feature representation $\tilde{\mathcal{R}}_k^{t-1,s}$ contributes more to the aggregated feature representation $\mathcal{R}_{k_{agg}}^{t}$. The formula is expressed as follows:

$$\mathcal{R}_{k_{agg}}^{t,s} = W \cdot \tilde{\mathcal{R}}_k^{t,s} + (1-W) \tilde{\mathcal{R}}_k^{t-1,s}$$

$\mathcal{R}_{k_{agg}}^{t,s}$ is the average feature representation of vehicle k in each local category after t rounds of aggregation, and it is used to train the global classifier. $\mathcal{R}_{k_{agg}}^{t,s}$ contains feature information at different times, and compared to the transmission of the entire model, the upload efficiency of feature representations is higher, especially in resource limited environments. During the aggregation process, clients corresponding to feature distributions that deviate significantly from the historical feature distribution will be assigned lower weights to ensure a unified feature representation that is not excessively affected by outliers or domain specific biases. By aggregating historical feature representations and current feature representations, historical information can be preserved to avoid losing useful features and patterns. This helps to maintain memory of previously learned information during the model update process, thereby better utilizing past experience and knowledge.

S08: Collecting all current feature representations $\mathcal{R}_{agg}^{t,s}$ to train the global classifier $\theta^t$ and distributing them to vehicle clients that participate in the next round of training, by the server.

The server-side collects the feature representation $\mathcal{R}_{k_{agg}}^{t,s}$ aggregated from all vehicles k that participate in the current round t to train the global classifier. The parameters are updated by calculating a gradient of a loss function l with respect to the global classifier $\theta^{t-1}$, and an updated formula is as follows:

$$\theta^t \leftarrow \theta^{t-1} - \eta_\theta \nabla l(\theta^{t-1}; \mathcal{R}_{k_{agg}}^{t,s}, s)$$

where, $\eta_\theta$ is a learning rate of the global classifier, $\nabla l(\theta^{t-1}; \mathcal{R}_{k_{agg}}^{t,s}, s)$ is the gradient of the loss function l on the global classifier $\theta^{t-1}$ based on the aggregated feature representations $\mathcal{R}_{k_{agg}}^{t,s}$ and label data S. The new global classifier $\theta^t$ will be distributed to selected vehicle clients in the next iteration.

The global classifier can integrate information from the outputs of multiple models, thereby improving the accuracy of overall prediction. By comprehensively considering the prediction results of multiple models, the bias of a single model can be reduced, the robustness of the model can be improved, and the risk of overfitting can be reduced, thereby improving the generalization ability of the model.

In the present disclosure, experimental evaluations were conducted on four image datasets MNIST, FashionMNIST, Cifar10, and Cifar100, respectively, and four strategies FedAvg, FedProx, SCAFFOLD, and MOON were used for the comparative method. All methods use the same hyperparameters, and the model uses a regular convolutional neural network model built with two convolutional layers and two fully connected layers. The local learning rate is set to 0.01, the learning rate of the server-side global classifier is set to 0.01, the batch size is set to 10, the client participation rate is set to 1, the u in FedProx and MOON is set to 0.01, and t in MOON is set to 1. The accuracy was tested on each dataset with different numbers of clients (10, 100) and under different distribution patterns, as shown in FIGS. 2A, 2B, 2C and 2D.

Figure 2A:
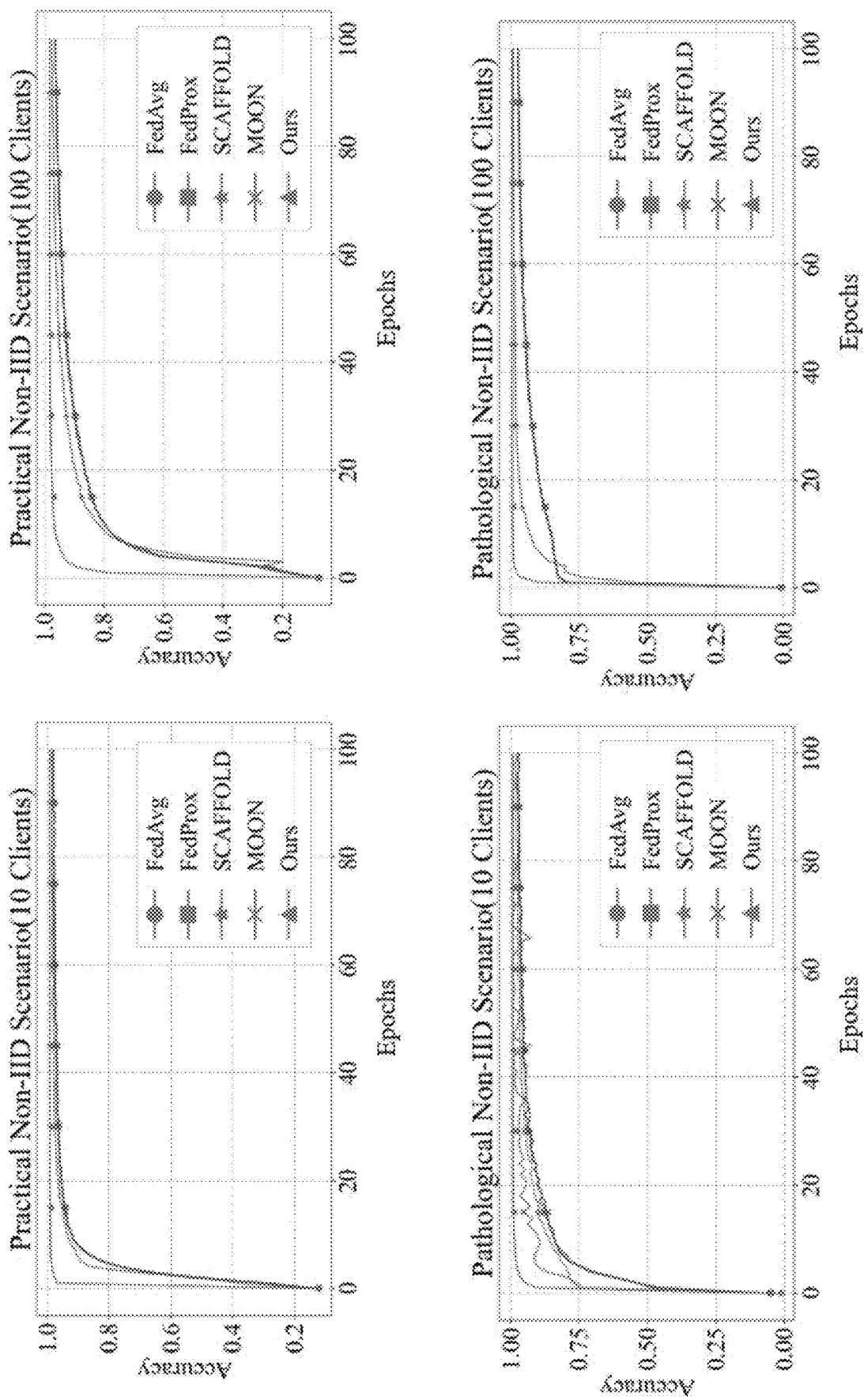
FIGS. 2A, 2B, 2C and 2D show performance of four strategies of 10 clients, 100 clients, a practical non-IID scenario and a pathological non-IID scenario, respectively, (a) for MNIST, (b) for Fashion MNIST, (c) for Cifar10 and (d) for Cifar100.
Figure 2B:
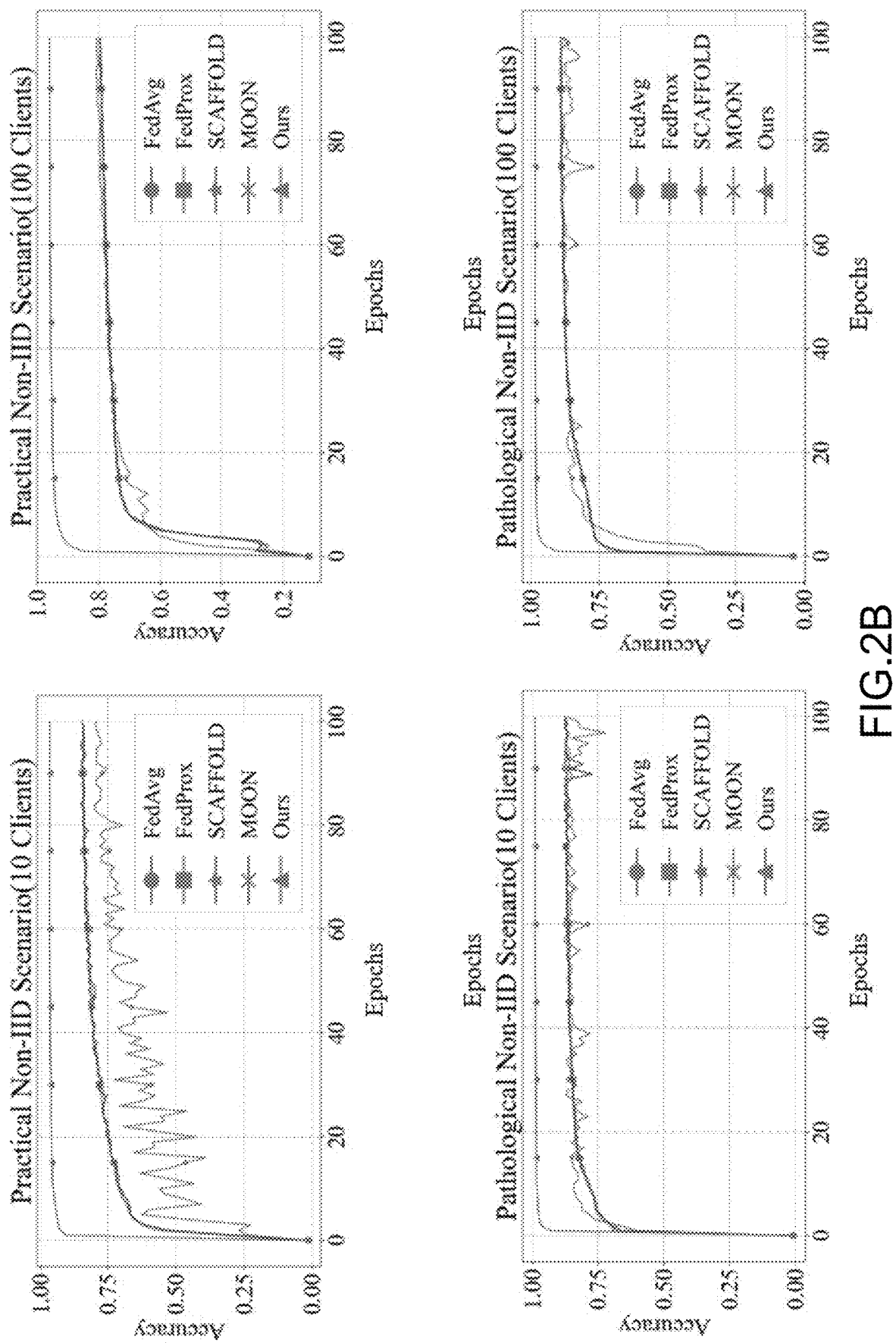
Figure 2C:
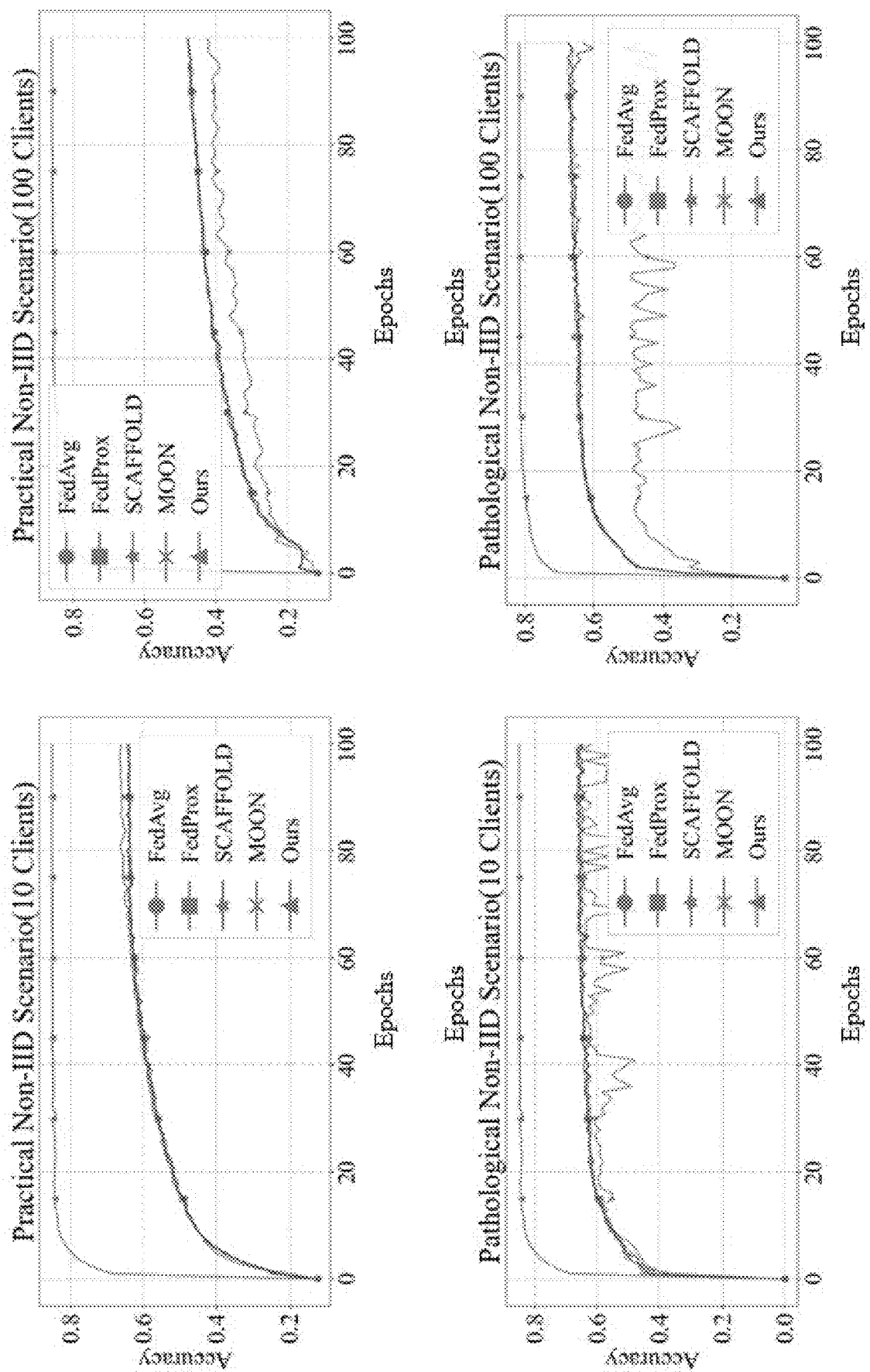
Figure 2D:
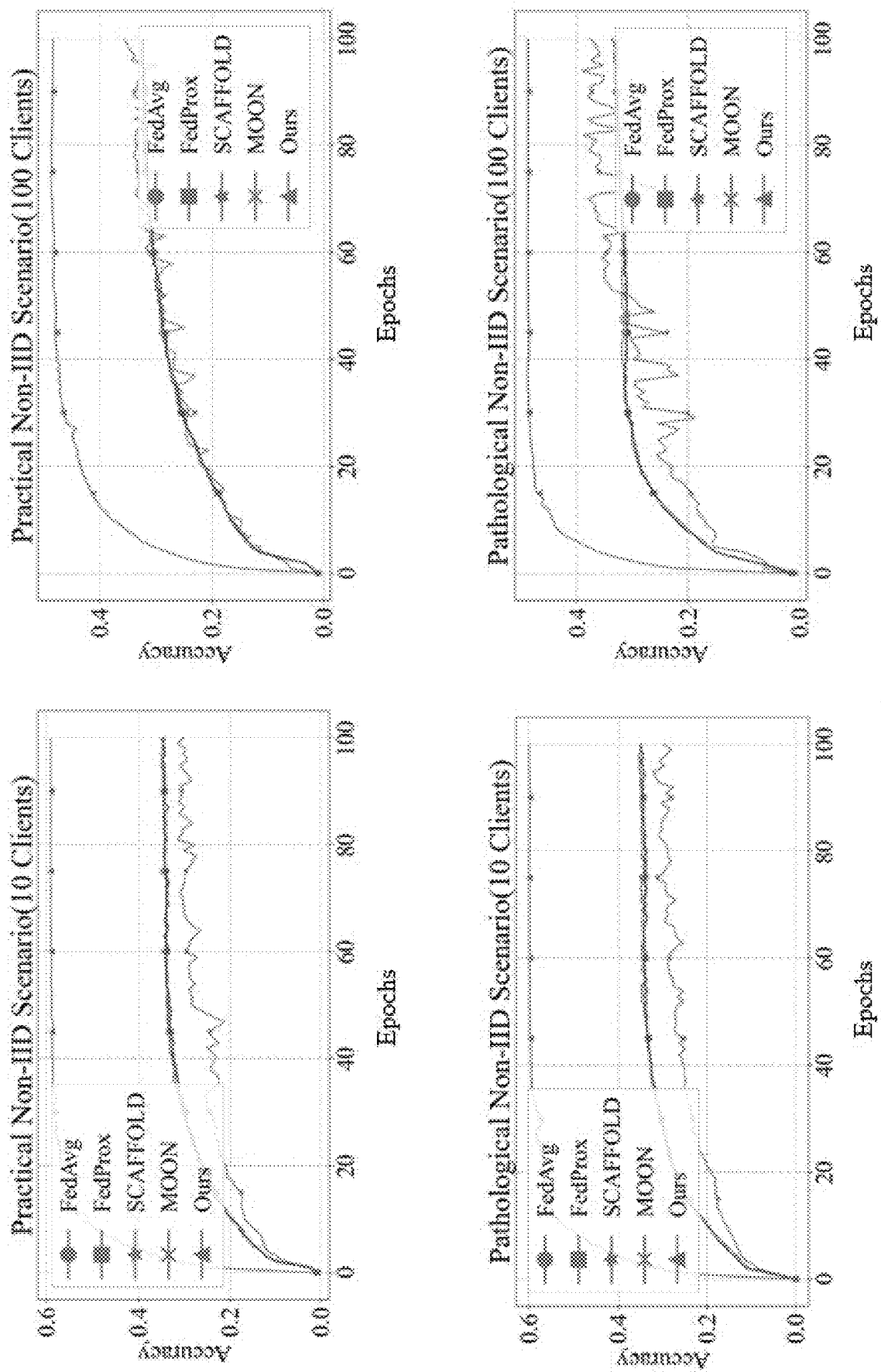

The number of categories in these four datasets is 10, 10, 10, and 100, respectively. Their complexity is ranked from small to large as MNIST, FashionMNIST, Cifar10, Cifar100. FIG. 2A shows a relationship curve between test accuracy and communication rounds on the MNIST dataset. It can be seen that under the task of identifying the simplest MNIST dataset, all federated strategies can converge to good results, ultimately achieving an accuracy of 0.98 or above. The method of the present disclosure outperforms the other four strategies with a slight difference in accuracy, but has the fastest convergence speed among all methods. From FIG. 2B, it can be seen that on the FashionMNIST dataset, the accuracy of the other four algorithms has significantly decreased due to the increased complexity of the dataset. The strategy of the present disclosure still maintains the highest testing accuracy and convergence speed in all four cases. FIG. 2C shows a relationship curve between the testing accuracy and communication rounds of various strategies on the Cifar10 dataset. When the number of clients is equal to 10 in the Dirichlet distribution, FedAvg, FedProx, SCAFFOLD, and MOON exhibit similar performance, with an accuracy of 0.6. The strategy of the present disclosure achieves an accuracy of over 0.8 with faster convergence, which is significantly ahead of the comparative method. When the number of clients increases to 100, the accuracy of the comparative strategy decreases to below 0.5 and the convergence speed decreases significantly. The method of the present disclosure still maintains an accuracy of over 0.8 and maintains high-speed convergence performance. When the number of pathological distribution clients is 10, the accuracy of FedAvg, FedProx, and MOON remains around 0.6, and the curve of SCAFFOLD begins to oscillate. At the same time, the strategy of the present disclosure still maintains an accuracy of 0.8 or above. When the number of clients increased to 100, the curve of SCAFFOLD showed more severe oscillations and a significant decrease compared to other methods, which may be due to SCAFFOLD being more sensitive to hyperparameters. FIG. 2D shows a relationship curve between the testing accuracy and communication rounds of various strategies on the Cifar100 dataset. In all four scenarios, the method of the present disclosure improved the accuracy by about 10% compared to the control method.

After the above experiments, the robustness and stability of the method of the present disclosure have been confirmed when facing non-IID data. The method of the present disclosure has the advantages of rapid convergence and high recognition rate. This is because before each round of training, the client collects similar client information based on the similarity matrix, and this knowledge sharing design accelerates the convergence speed of the system. The combination of personalized feature extractor and global classifier demonstrates excellent performance when facing strongly heterogeneous client data. The advantage of this combination is that it separates feature extraction and classification tasks, allowing each task to be optimized for specific needs. Personalized feature extractors can be specifically designed for specific data structures or domain knowledge to extract the most informative features, and the global classifiers can optimize classification based on the extracted features, thereby improving overall classification performance.

Figure 3A:
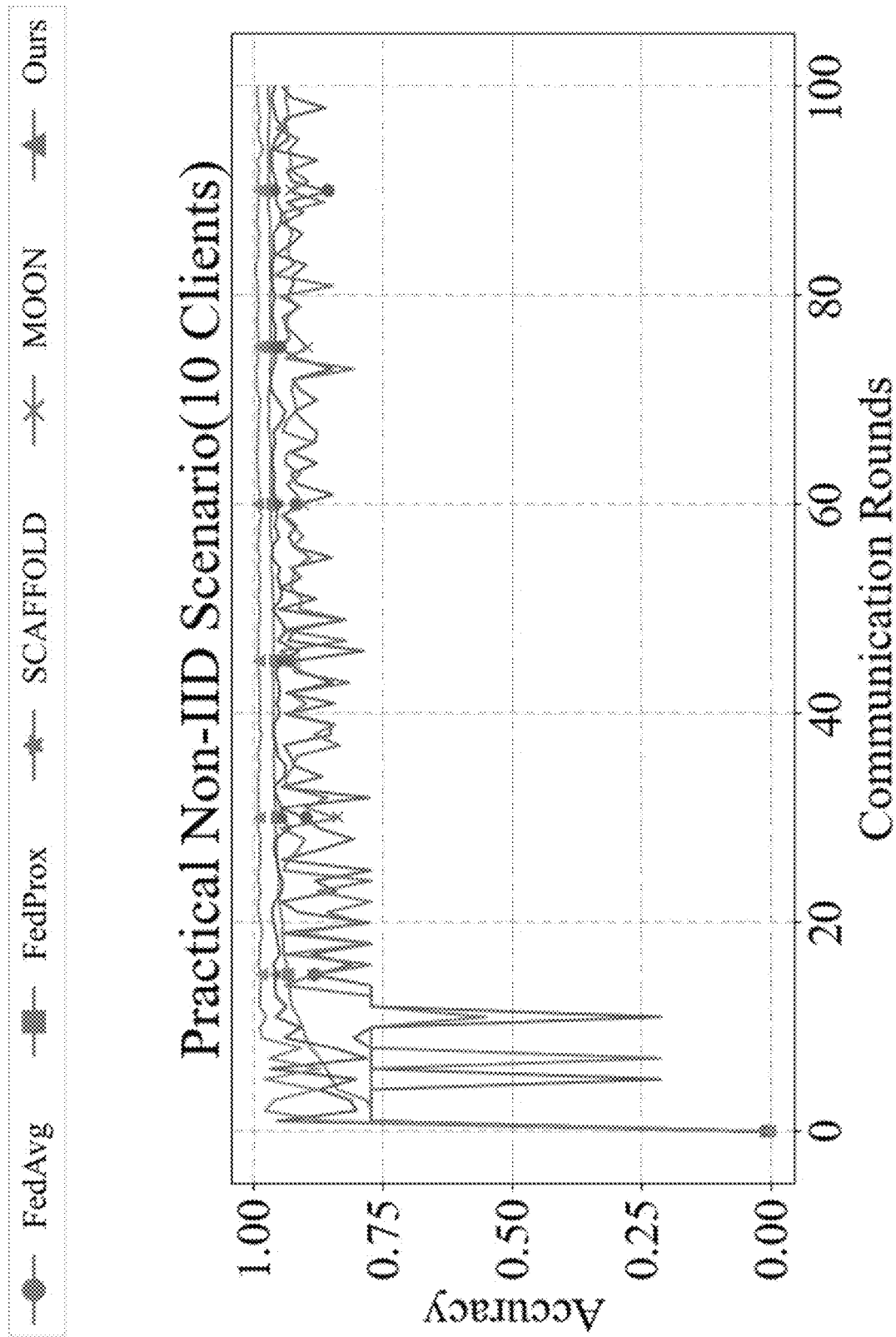
FIGS. 3A, 3B, 3C and 3D show performance results of four comparison strategies provided by the present disclosure and the strategy of the present disclosure when facing the network intrusion detection dataset NSL-KDD.
Figure 3B:
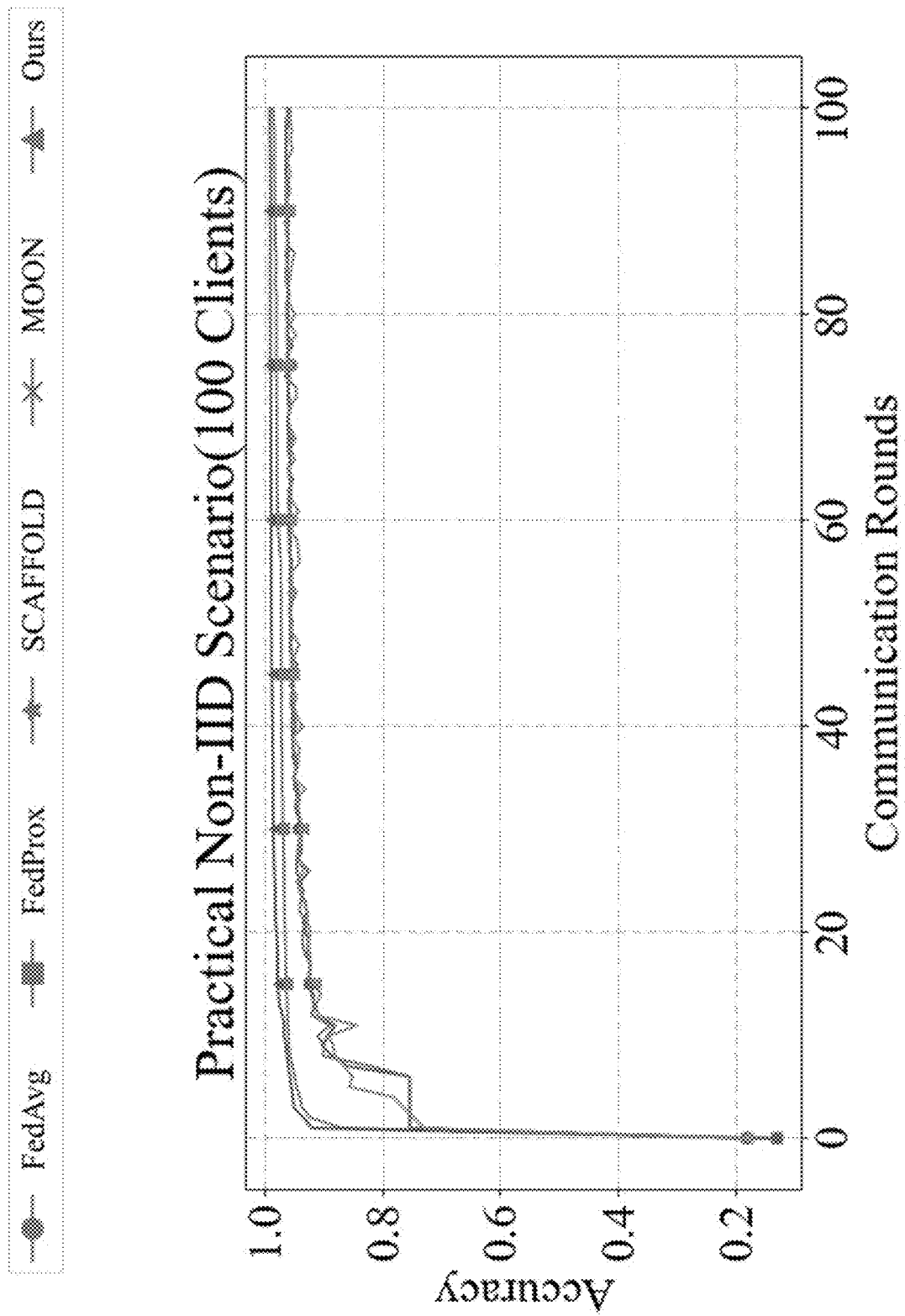
Figure 3C:
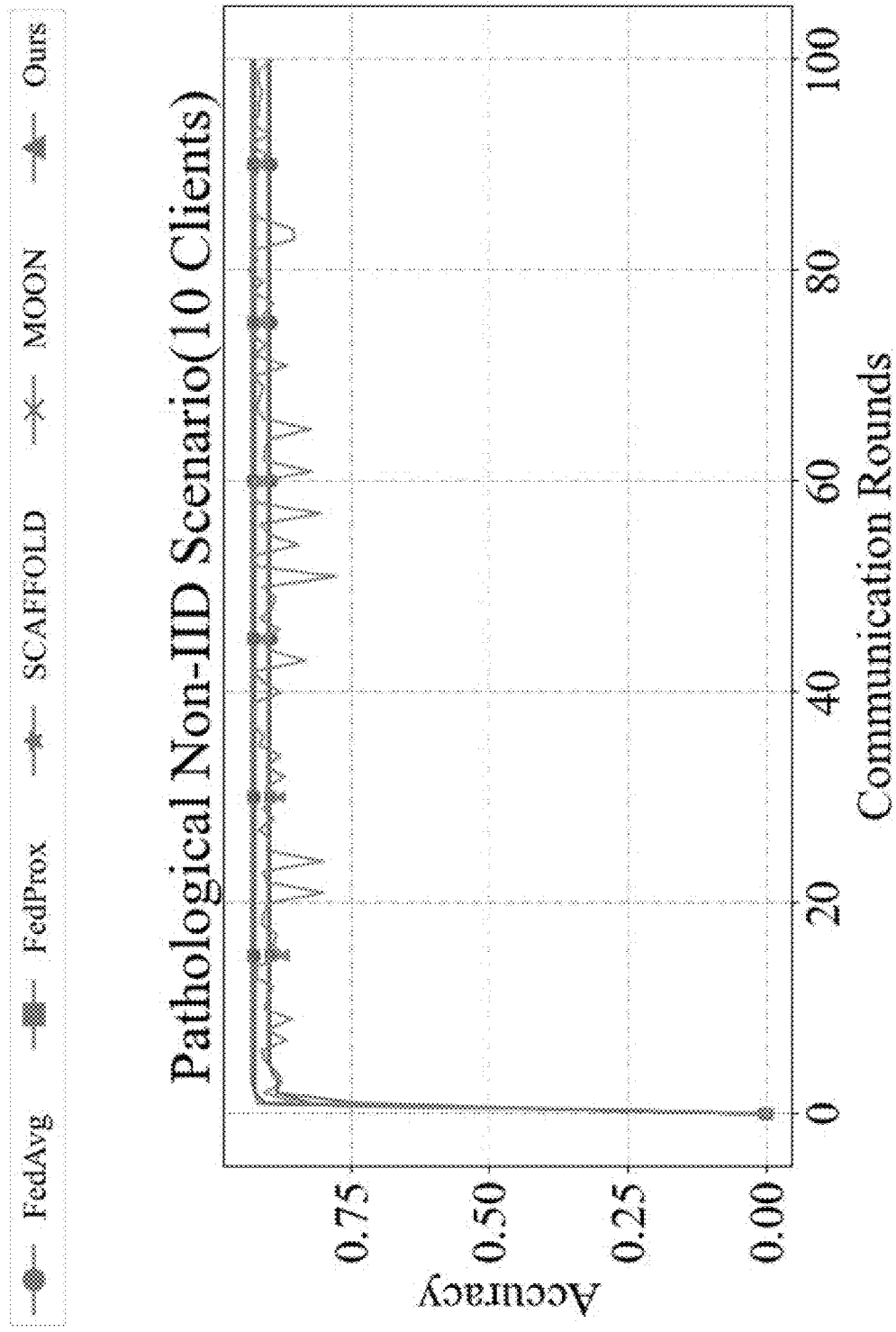
Figure 3D:
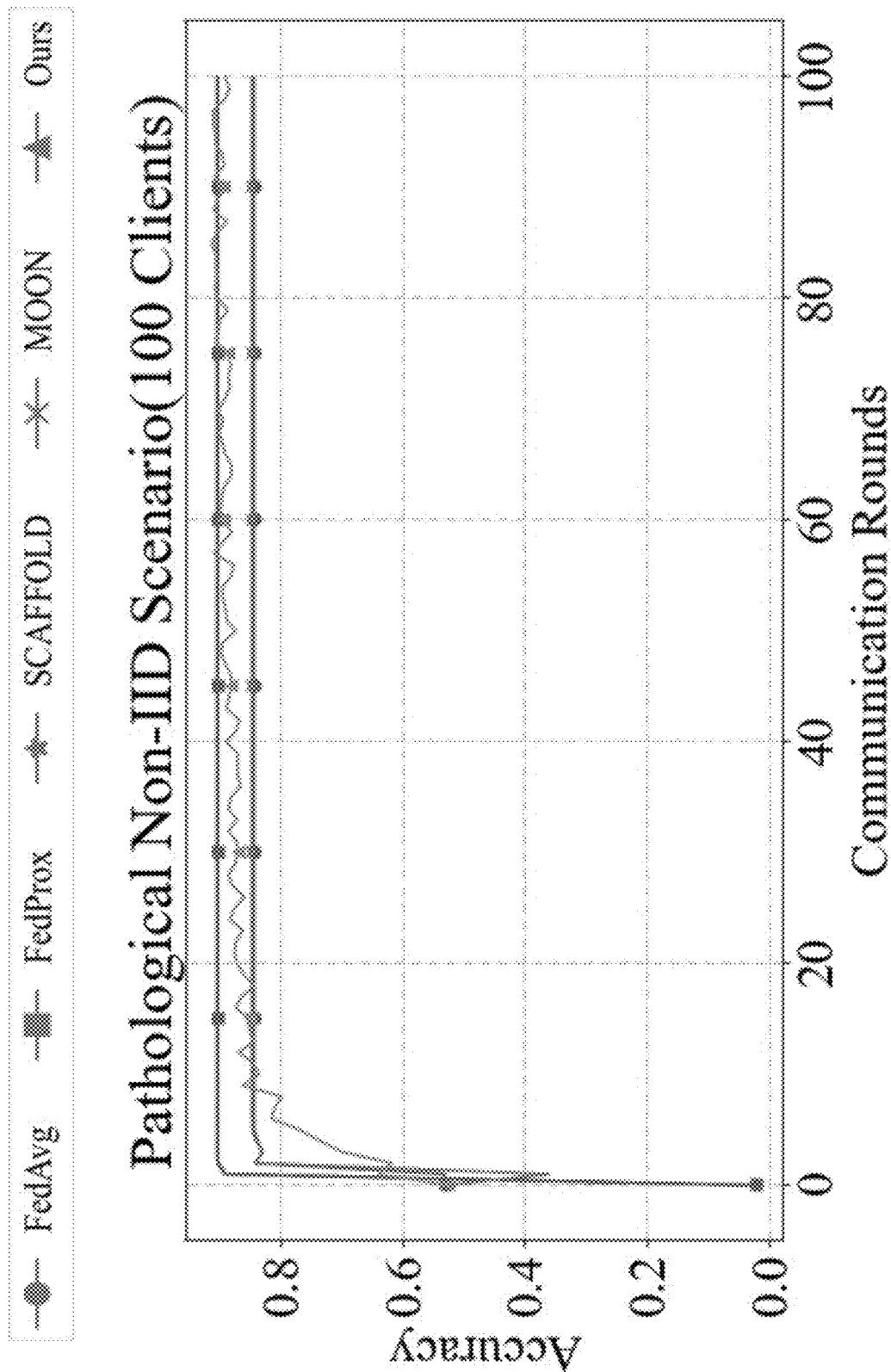

FIGS. 3A, 3B, 3C and 3D show the performance of different strategies on the NSL-KDD dataset. On the NSL-KDD dataset, it was observed that various federated learning strategies achieved relatively ideal recognition accuracy, mainly due to the characteristics of the dataset. After mapping, the NSL-KDD dataset has a total of five categories, with Normal and Dos accounting for 90% of the entire dataset. Due to the limited number of categories in this dataset, recognition is relatively easy. From FIGS. 3A, 3B, 3C and 3D, it can be seen that all strategies have achieved relatively ideal recognition accuracy. FIG. 3A shows the performance of a practical non-IID scenario with 10 clients. FedAvg and MOON experienced significant fluctuations before 20 rounds and maintained small fluctuations; FedProx, SCAFFOLD and the present disclosure gradually stabilizes after small oscillations. And the present disclosure achieves the highest recognition accuracy. In the three scenarios shown in FIGS. 3B, 3C and 3D, the present disclosure exhibits slight oscillations, with a difference of less than 0.02 compared to the best performing strategy. In the recognition of simple tasks, although the present disclosure can maintain ideal accuracy, it cannot differentiate itself from other strategies. This is because the NSL-KDD dataset is relatively simple, and each strategy can learn data features well, so there is not much difference in performance.

Figure 4A:
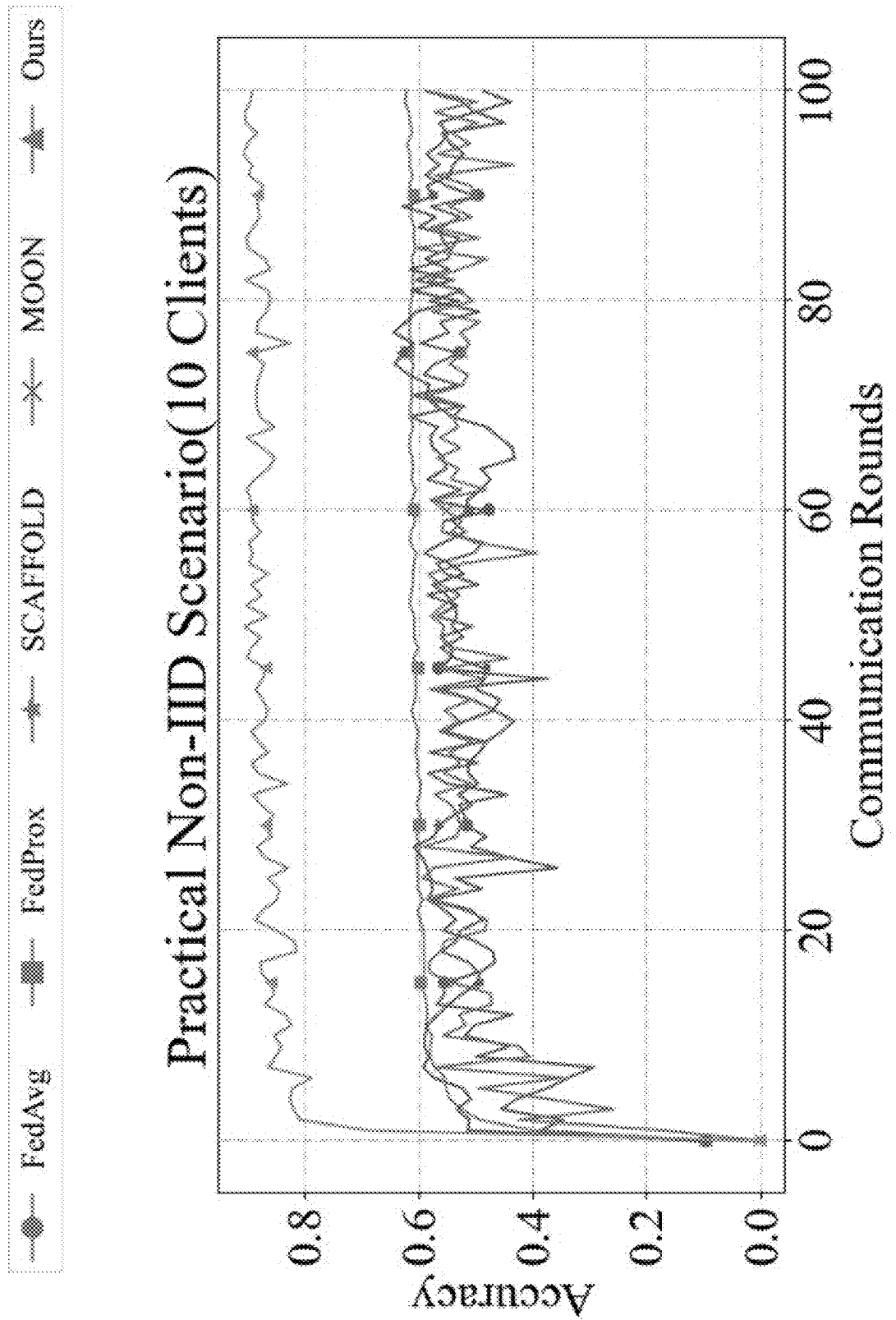
FIGS. 4A, 4B, 4C and 4D show performance results of the four control strategies provided by the present disclosure and the strategy of the present disclosure when facing the network intrusion detection dataset UNSW-NB15.
Figure 4B:
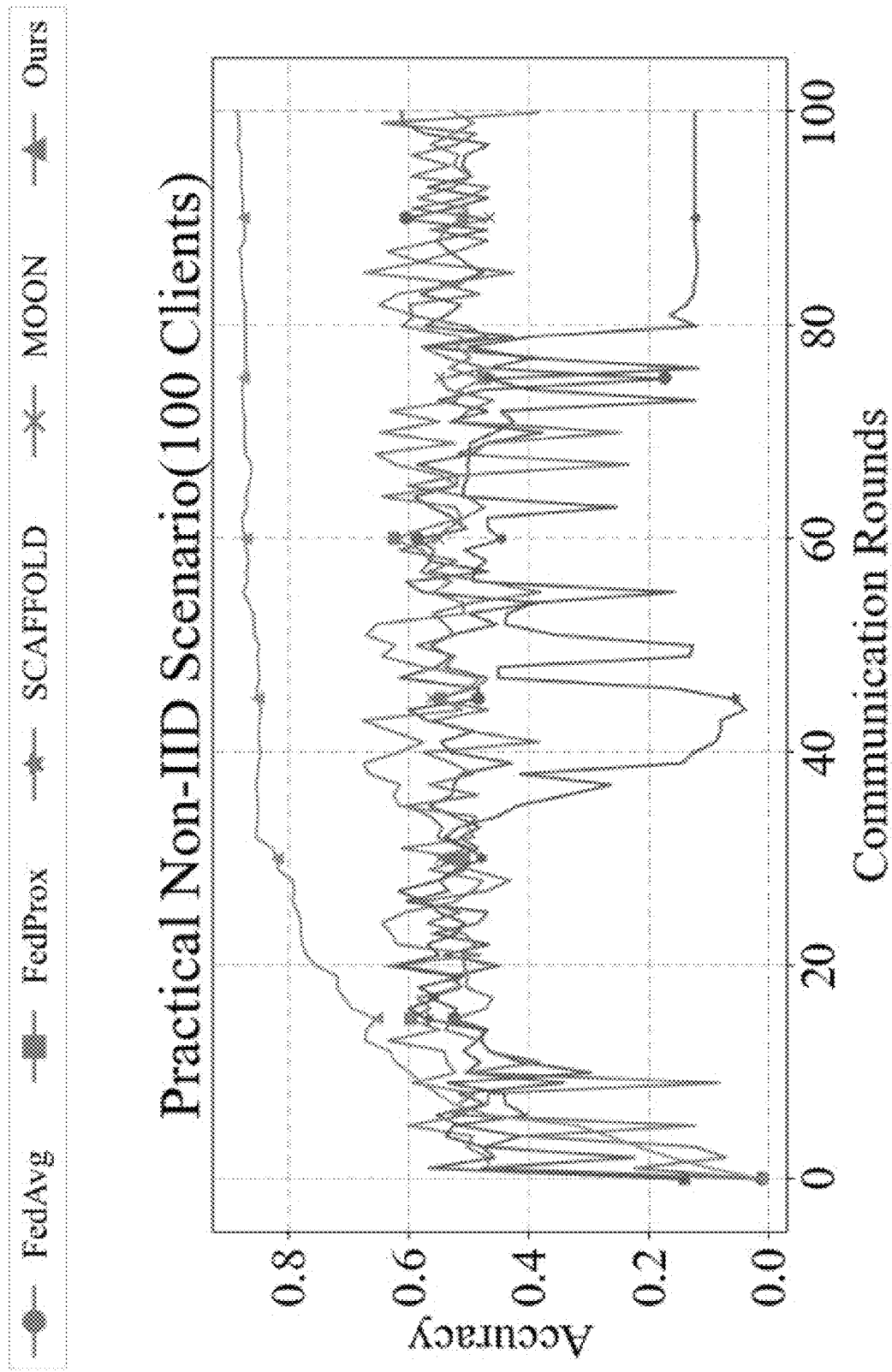
Figure 4C:
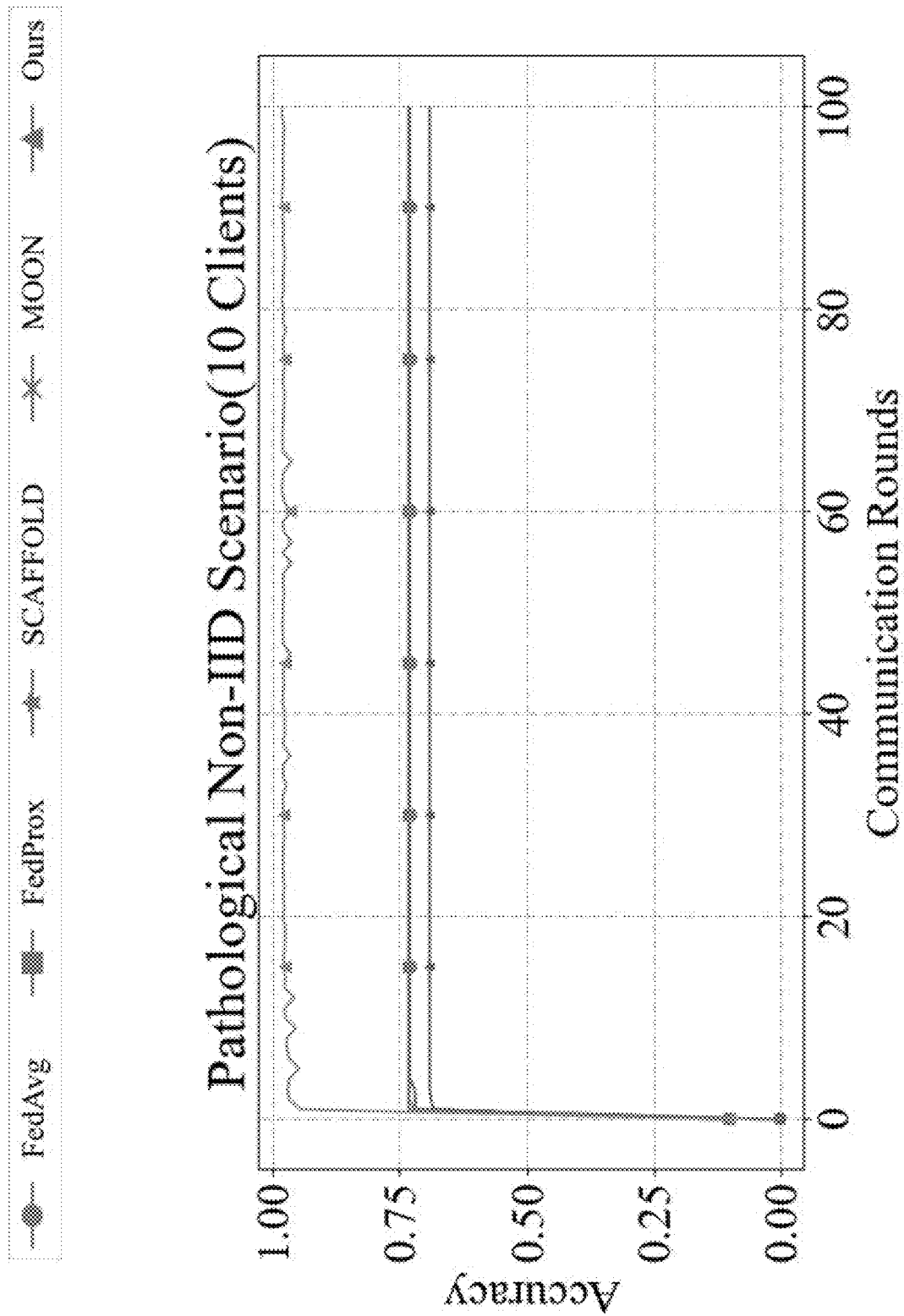
Figure 4D:
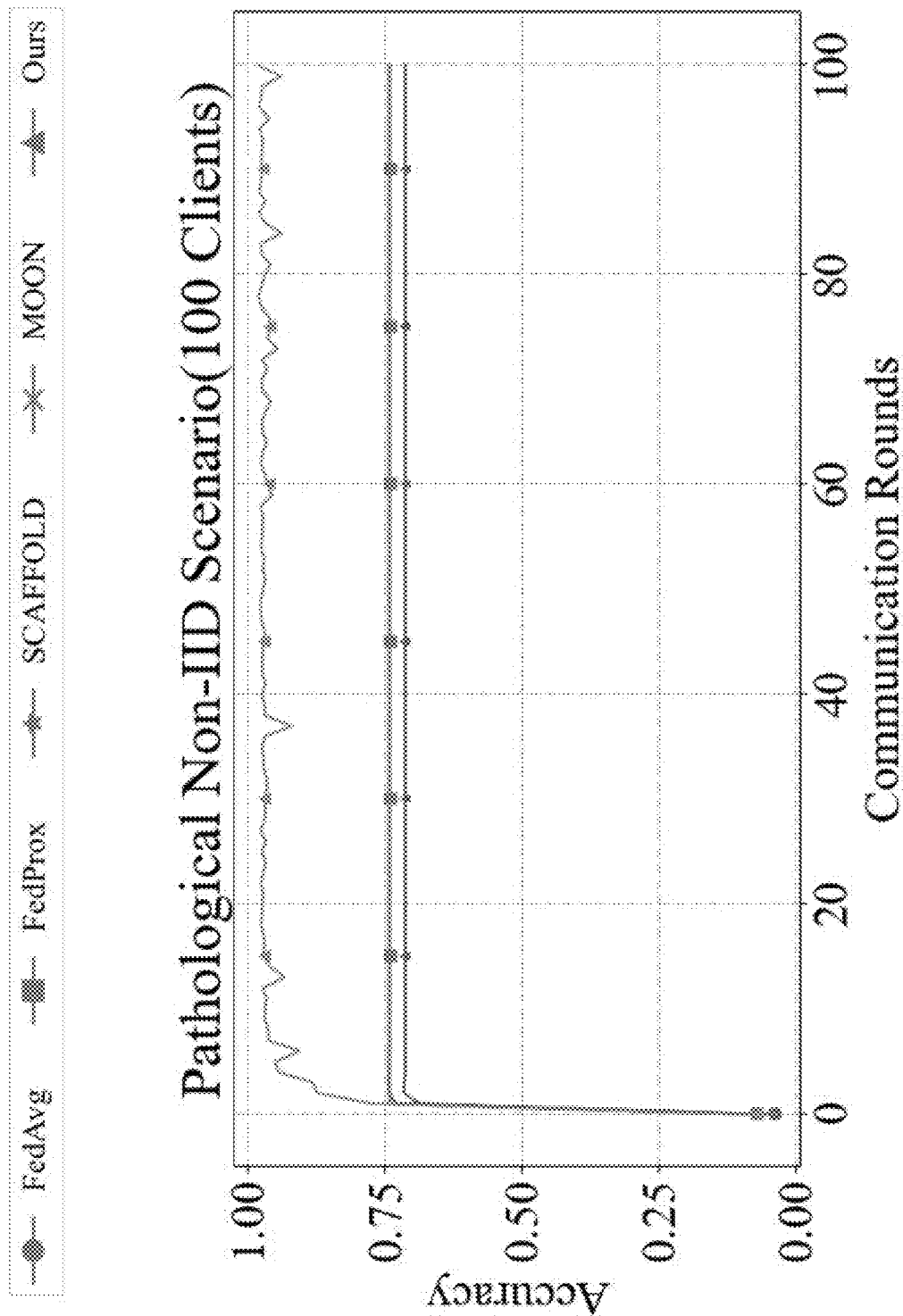

FIGS. 4A, 4B, 4C and 4D shows performances of different strategies on the UNSW-NB15 dataset. Compared to NSL-KDD, the UNSW-NB15 dataset has higher complexity and more categories. FIG. 4A shows a real-world non independent and identically distributed scenario with 10 clients, all strategies exhibit varying degrees of oscillation. The present disclosure achieves an accuracy of 0.8 or higher, and slight oscillations occur within this accuracy range. Among the comparison methods, FedProx performed the best, achieving an accuracy of 0.6 and the smallest oscillation amplitude. This is because FedProx introduces additional penalty terms in the optimization function to encourage participant models to approach the global model and better reflect the characteristics of the overall dataset. Other strategies have experienced significant oscillations and recognition accuracy below 0.6. When the number of clients is increased to 100, as shown in FIG. 4B, the oscillation amplitude of the comparison model's curve further increased, and FedProx also showed significant oscillations. In contrast, although the convergence speed of the strategy of the present disclosure slows down in the first 30 rounds, it can still maintain a recognition accuracy of 0.85 and is most stable in this situation. However, the SCAFFOLD strategy experienced the maximum amplitude oscillation in this situation and repeatedly oscillated in the second half of the rounds, ultimately failing to converge. In pathologically non-independent and identically distributed scenarios, as shown in FIGS. 4C and 4D, the control strategies did not exhibit significant oscillations and reached the upper limit of recognition performance in early rounds. This is because in the case of pathological distribution, the present disclosure sets each client to only contain two categories. The extreme imbalance of sample distribution resulted in insufficient learning of the characteristics of a small number of categories, and only the characteristics of many categories were learned, thus quickly reaching the performance limit. Unlike traditional federated learning strategies, the present disclosure is no longer limited to generating only one global model, but rather generates its own personalized model for each client. The present disclosure still exhibits slight fluctuations even after rapidly achieving an accuracy of 0.9, as the design of knowledge sharing and global classifiers surpasses the performance limits of traditional federated learning. Compared to traditional federated learning strategies, the present disclosure fully considers the heterogeneity between clients. In traditional methods, for clients with highly heterogeneous distributed datasets, it is difficult to learn beneficial information from models of other clients, which can lead to a decrease in accuracy. However, the present disclosure first utilizes the similarity between models to select a part of clients for enhanced aggregation of feature extractors, ensuring that the collected information from other clients contributes positively to its personalized model. Then, the feature representations of these clients is used to train a global classifier, fully considering global information. Since the features are extracted by personalized feature extractors, the present disclosure is not limited by traditional federated learning strategies. On the highly complex and heterogeneous UNSW-NB15 dataset, this design exhibits significant performance differences compared to traditional federated learning strategies.

Any aspects not mentioned in the present disclosure are applicable to the prior art.

Obviously, the above embodiments are only examples provided for clear illustration, and not to limitation on the implementation modes. For ordinary technical personnel in the relevant field, other forms of changes or modifications can be made based on the above explanation. It is not necessary and impossible to exhaustively list all implementation mods here. The obvious changes or variations arising from this are still within the protection scope of the present disclosure.

What is claimed is:

1. A method for constructing a vehicle networking intrusion detection model based on federated learning, comprising the following steps:

decoupling a local model in vehicles according to a feature extractor and a classifier;

selecting randomly clients to participate in training, and selecting other vehicle clients with higher similarity to each vehicle client that participates in training with a similarity matrix;

collecting a local feature extractor from each vehicle client and distributing collected feature extractor parameters and a global classifier obtained from a previous round of the vehicle client to each vehicle client, by a server;

aggregating the local classifiers of each vehicle client that participates in training with the feature extractors of other vehicle clients distributed by the server to form an evaluation model that comprises multiple feature extractors;

evaluating an obtained evaluation model on the local model of each vehicle client and updating weights of the similarity matrix to obtain an updated local feature extractor $\varphi_k^t$ of the vehicle client;

combining the updated local feature extractor $\varphi_k^t$ of the vehicle client with the previous round's global classifier $\theta^{t-1}$, and updating the local model $\omega_k^t$ by performing gradient descent of a loss function on the local model of the vehicle client;

aggregating feature representations extracted from a local dataset with the local feature extractors of the vehicle client after and before updating to obtain a current feature representation $R^{t,s}_{agg}$;

collecting all current feature representations $R^{t,s}_{agg}$ to train the global classifier $\theta^t$, and distributing them to vehicle clients that participate in a next round of training, by the server.

2. The method for constructing a vehicle networking intrusion detection model based on federated learning according to claim 1, wherein updating the similarity matrix $M_N$ comprises:

normalizing a sum of all weights to 1 using a normalization operation;

$$\hat{\delta}^t_{k,i} = \frac{\delta^t_{k,i}}{\sum_{i \in n} \delta^t_{k,i}}$$

weighting and summing a difference between a similar vehicle client's feature extractor $\varphi_k^t$ and the previous round's feature extractor $\phi_k^{t-1}$ using the normalized weight $\hat{\delta}_{k,i}$ to update the feature extractor $\varphi_k^t$ of the local model $\omega_i^t$, and it is expressed as:

$$\varphi_k^t = \varphi_k^{t-1} + \sum_{i \in n} \hat{\delta}_{k,i}(\varphi^t_{k,i} - \varphi_k^{t-1})$$

after updating weights $$[\hat{\delta}^t_{k,1}, \ldots, \hat{\delta}^t_{k,n}]$$

of n vehicle clients with high similarity to a vehicle client k, updating a weight vector $$\delta^t_k$$

of the vehicle client k;

collecting updated weights $$<\delta^t_1, \ldots, \delta^t_k>$$

for each vehicle client that participates in training and updating the similarity matrix $M_N$ by the server.

3. The method for constructing a vehicle networking intrusion detection model based on federated learning according to claim 1, wherein training a global classifier with all current feature representations collected by the server comprises:

extracting features from the local dataset of the vehicle client with the previous round's historical feature extractor and new feature extractor after weight updating, obtaining corresponding historical feature representations and current feature representations;

classifying the current feature representations and historical feature representations of the obtained vehicle client according to a data category;

calculating a distribution difference between the current feature representations and the historical feature representations with a maximum mean difference statistical method, obtaining a maximum mean distribution difference between the historical feature representations and the current feature representations;

using a normalized maximum mean difference as a weight, aggregating the historical feature representations and the current feature representations to obtain a feature representation $R^{t,s}_{agg}$ that combines historical and current information;

collecting the feature representations $R^{t,s}_{agg}$ aggregated by all vehicle clients that participate in training in the current round t to train a global classifier, by the server;

calculating a gradient of the loss function l with respect to the global classifier $\theta^{t-1}$, and obtaining a new global classifier $\theta^t$.

4. The method for constructing a vehicle networking intrusion detection model based on federated learning according to claim 3, wherein the extracting features from the local dataset of the vehicle client with the previous round's historical feature extractor $\varphi_k^{t-1}$ and new feature extractor $\varphi_k^t$ after weight updating and obtaining corresponding feature representations comprise:

$$\hat{\mathcal{R}}_k^{t-1,s} = \frac{1}{|D_k^s|} \sum_{i \in D_k^s} \mathcal{F}_k^{t-1}(\varphi_k^{t-1}; x_i);$$

$$\hat{\mathcal{R}}_k^{t,s} = \frac{1}{|D_k^s|} \sum_{i \in D_k^s} \mathcal{F}_k^t(\varphi_k^t; x_i);$$

wherein $F_k^t(\varphi_k^t; x_i)$ is extracting features from a sample subset $x_i$ of the local dataset $D_k^s$ for a $k^{th}$ vehicle client using the new feature extractor $\varphi_k^t$;

$F_k^{t-1}(\varphi_k^{t-1}; x_i)$ is extracting features from a sample subset $x_i$ of the local dataset $D_k^s$ for the $k^{th}$ vehicle client using the historical feature extractor $\varphi_k^{t-1}$;

$\tilde{\mathcal{R}}_k^{t-1,s}$ and $\tilde{\mathcal{R}}_k^{t,s}$ are average feature representations of the $k^{th}$ vehicle client for each category in rounds t−1 and t, respectively.

5. The method for constructing a vehicle networking intrusion detection model based on federated learning according to claim 3, wherein the calculating a distribution difference between the current feature representations and the historical feature representations with a maximum mean difference statistical method, obtaining a maximum mean distribution difference between the historical feature representations and the current feature representations, and a distance is represented as follows:

$$MMD(P, Q) = \frac{1}{n_{old}^2} \sum_{p=1}^{n_{old}} \sum_{q=1}^{n_{old}} k\left(\hat{\mathcal{R}}_k^{t-1,s}{}_p, \hat{\mathcal{R}}_k^{t-1,s}{}_q\right) +$$

$$\frac{1}{n_{new}^2} \sum_{p=1}^{n_{new}} \sum_{q=1}^{n_{new}} k\left(\hat{\mathcal{R}}_k^{t,s}{}_p, \hat{\mathcal{R}}_k^{t,s}{}_q\right) - \frac{2}{n_{old} n_{new}} \sum_{p=1}^{n_{old}} \sum_{q=1}^{n_{new}} k\left(\hat{\mathcal{R}}_k^{t,s}{}_p, \hat{\mathcal{R}}_k^{t-1,s}{}_q\right)$$

$$\frac{1}{n_{old}^2} \sum_{p=1}^{n_{old}} \sum_{q=1}^{n_{old}} k\left(\hat{\mathcal{R}}_k^{t-1,s}{}_p, \hat{\mathcal{R}}_k^{t-1,s}{}_q\right)$$

represents an internal self-similarity of the historical feature representation of round t−1;

$$\frac{1}{n_{new}^2} \sum_{p=1}^{n_{new}} \sum_{q=1}^{n_{new}} k\left(\hat{\mathcal{R}}_{k\ p}^{t,s}, \hat{\mathcal{R}}_{k\ q}^{t-1,s}\right)$$

represents an internal self-similarity of the current feature representation of round t;

$$-\frac{2}{n_{old} n_{new}} \sum_{p=1}^{n_{old}} \sum_{q=1}^{n_{new}} k\left(\hat{\mathcal{R}}_{k\ p}^{t,s}, \hat{\mathcal{R}}_{k\ q}^{t-1,s}\right)$$

represents a cross similarity of data distribution between the historical feature representations and the current feature representations;

P and Q represent probability distributions of the historical feature representations $\tilde{\mathcal{R}}_k^{t-1,s}$ and the current feature representations $\tilde{\mathcal{R}}_k^{t,s}$, respectively;

$R_{old}$ and $n_{new}$ represent the number of samples for the historical feature representations $\tilde{\mathcal{R}}_k^{t-1,s}$ and the current feature representations $\tilde{\mathcal{R}}_k^{t,s}$, respectively;

k(•,•) is a Gaussian kernel function configured to measure the similarity between two samples.

6. The method for constructing a vehicle networking intrusion detection model based on federated learning according to claim 3, wherein a normalized maximum mean difference is used as the weight W, and its expression is:

$$W = 1 - \frac{MMD_{value} - MMD_{min}}{MMD_{max} - MMD_{min}}$$

wherein $MMD_{value}$ is a maximum mean distribution difference between the calculated historical feature representations and the current feature representations;

$MMD_{max}$ is a maximum value among the calculated MMD values;

$MMD_{min}$ is a minimum value among the calculated MMD values.

\* \* \* \* \*